US011373321B2

(12) United States Patent
You et al.

(10) Patent No.: US 11,373,321 B2
(45) Date of Patent: Jun. 28, 2022

(54) PROJECTOR INCLUDING META-LENS

(71) Applicant: SAMSUNG ELECTRONICS CO., LTD., Suwon-si (KR)

(72) Inventors: Jangwoo You, Seoul (KR); Byunghoon Na, Suwon-si (KR); Seunghoon Han, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 576 days.

(21) Appl. No.: 16/192,995

(22) Filed: Nov. 16, 2018

(65) Prior Publication Data

US 2019/0139243 A1 May 9, 2019

Related U.S. Application Data

(63) Continuation-in-part of application No. 15/992,829, filed on May 30, 2018.

(30) Foreign Application Priority Data

Nov. 8, 2017 (KR) ........................ 10-2017-0148313

(51) Int. Cl.
*G06T 7/521* (2017.01)
*H04N 13/254* (2018.01)
(Continued)

(52) U.S. Cl.
CPC .............. *G06T 7/521* (2017.01); *G01B 11/25* (2013.01); *G02B 1/118* (2013.01); *G02B 3/00* (2013.01); *G02B 5/208* (2013.01); *G06T 7/593* (2017.01); *H04N 5/23245* (2013.01); *H04N 13/122* (2018.05); *H04N 13/239* (2018.05); *H04N 13/25* (2018.05); *H04N 13/254* (2018.05); *G02B 2003/0093* (2013.01);
(Continued)

(58) Field of Classification Search
None
See application file for complete search history.

(56) References Cited

U.S. PATENT DOCUMENTS 7,431,464 B2 10/2008 Park
8,637,834 B2 1/2014 Knippelmeyer et al.
(Continued)

FOREIGN PATENT DOCUMENTS

JP 2011-181519 A 9/2011
WO 2017176921 A1 10/2017

OTHER PUBLICATIONS

Communication dated Feb. 1, 2019, issued by the European Patent Office in counterpart European Application No. 18180552.4.
Amir Arbabi et al., "An optical metasurface planar camera" Arxiv. org, Cornell University Library, Apr. 21, 2016 (29 pages total).

*Primary Examiner* — Stuart D Bennett
(74) *Attorney, Agent, or Firm* — Sughrue Mion, PLLC

(57) ABSTRACT

Provided are projectors, each including a light source configured to emit laser light, a substrate spaced apart from the light source, a pattern mask including a pattern disposed on a first surface of the substrate, the first surface facing the light source, and a meta-lens including a plurality of first nanostructures formed on a second surface of the substrate, the second surface opposite the first surface, the nanostructures having a dimension of a sub-wavelength that is less than a wavelength of light emitted from the light source.

19 Claims, 14 Drawing Sheets

(51) Int. Cl.
*H04N 13/239* (2018.01)
*G06T 7/593* (2017.01)
*G02B 3/00* (2006.01)
*G02B 5/20* (2006.01)
*H04N 5/232* (2006.01)
*H04N 13/25* (2018.01)
*G02B 1/118* (2015.01)
*G01B 11/25* (2006.01)
*H04N 13/122* (2018.01)
*H04N 13/00* (2018.01)
*H04N 13/128* (2018.01)

(52) U.S. Cl.
CPC ............. *G06T 2207/10028* (2013.01); *G06T 2207/10152* (2013.01); *H04N 13/128* (2018.05); *H04N 2013/0081* (2013.01)

(56) References Cited

U.S. PATENT DOCUMENTS

| | | | |
|---|---|---|---|
| 8,836,766 B1 | 9/2014 | Hebert et al. | |
| 9,218,755 B2 | 12/2015 | Chapman et al. | |
| 2011/0188054 A1* | 8/2011 | Petronius | F21V 13/04 356/610 |
| 2013/0113927 A1 | 5/2013 | De Brujin et al. | |
| 2014/0247326 A1 | 9/2014 | Hebert et al. | |
| 2014/0376092 A1 | 12/2014 | Mor | |
| 2015/0341619 A1* | 11/2015 | Meir | G01B 11/2545 348/47 |
| 2016/0094780 A1* | 3/2016 | Monkiewicz | H04N 5/2251 348/164 |
| 2016/0291200 A1* | 10/2016 | Bakin | G01V 8/20 |
| 2016/0299337 A1 | 10/2016 | Arbabi et al. | |
| 2016/0316180 A1 | 10/2016 | Han et al. | |
| 2019/0154877 A1* | 5/2019 | Capasso | G02B 1/00 |

* cited by examiner

PROJECTOR INCLUDING META-LENS

CROSS-REFERENCE TO RELATED APPLICATION

This is a Continuation-In-Part application of U.S. application Ser. No. 15/992,829 filed on May 30, 2018, which claims priority from claims priority from Korean Patent Application No. 10-2017-0148313, filed on Nov. 8, 2017, in the Korean Intellectual Property Office, the disclosure of which is incorporated herein in its entirety by reference.

BACKGROUND

1. Field

Example embodiments relate to projectors including meta-lenses.

2. Description of the Related Art

Recently, the demand for miniaturization of laser projectors for combining with any of various electronic devices has increased. For example, for augmented reality (AR), virtual reality (VR), or mixed reality (MR) realized on mobile and wearable devices, a subminiature projector may be used. Also, in order to recognize an object, such as a human or a thing, a laser projector may be used in order to form structured light in a depth sensor that is used for recognition of a precise three-dimensional image.

A laser projector of the related art includes a lens module including several sheets of optical lenses to realize a desired performance. Thus, the lens module is an obstacle for reducing the size of the laser projector. Also, it is very difficult to manufacture several sheets of optical lenses to have correct sizes, and further, the assembly and alignment of the manufactured optical lenses are difficult.

SUMMARY

One or more example embodiments may provide projectors configured to emit light by using a nanostructured meta-lens.

Additional example aspects and advantages will be set forth in part in the description which follows and, in part, will be apparent from the description, or may be learned by practice of the presented example embodiments.

According to an aspect of an example embodiment, a projector includes a light source configured to emit laser light, a substrate spaced apart from the light source by a predetermined distance, a pattern mask including a predetermined pattern on a first surface of the substrate, the first surface facing the light source, and a meta-lens including a plurality of first nanostructures on a second surface of the substrate, the second surface facing the first surface, the first nanostructures having a sub-wavelength dimension that is less than a wavelength of light emitted from the light source.

The pattern mask may include a first portion which is a region where laser light is absorbed or reflected and a second portion which is a region where laser light is transmitted, a pattern of the pattern mask is an image pattern formed by the second portion, and the image pattern is regularly or randomly arranged so as to form a predetermined structured light pattern.

The nanostructures may receive the structured light pattern and focus it on a focusing plane spaced apart from the meta-lens.

The pattern mask may be configured to contact the substrate.

The pattern mask may include a metal, a black matrix, or a polymer.

The light source may directly emit light with respect to the pattern mask, and may be a surface light-emitting diode.

The nanostructures may include a material having a refractive index greater than that of a peripheral material.

The projector may further include a housing fixing the light source and the substrate, such that the projector is an integrated module.

The nanostructures may be arranged with an arrangement pitch less than a half of a wavelength of light emitted from the light source.

The substrate may include a first substrate and a second substrate stacked on the first substrate.

The light source may be an edge emitting device, an upper surface of which is parallel to the substrate, and the projector may further include a path change member that reflects light emitted from the edge emitting device to the first surface of the substrate.

The projector may further include a second meta-lens including a plurality of second nanostructures on a surface of the pattern mask facing the light source.

The second meta-lens may include a material having a refractive index greater than that of a peripheral material.

The second meta-lens may collimate incident light.

The second nanostructures may include semi-cylindrical lenses.

The projector may further include a protective layer covering the pattern mask on the first surface of the substrate.

The protective layer may include a material having a refractive index lower than that of the second meta-lens.

According to an aspect of another example embodiment, a depth recognition apparatus may include: any one of the above-described projectors configured to emit structured light onto an object; a first sensor and a second sensor that are configured to receive light coming from the object and arranged at different positions relative to the projector; and a processor configured to analyze the light received by at least one of the first and second sensors to calculate a depth position of the object.

The processor may be configured to: obtain first image data from the light received at the first sensor; obtain second image data from the light received at the second sensor; and calculate the depth position of the object from the first image data and the second image data.

The processor may be configured to: obtain first depth information about the object by analyzing the structured light emitted from the projector to the object and the light received at the first sensor; obtain second depth information about the object by analyzing the structured light emitted from the projector to the object and the light received at the second sensor; and calculate the depth position of the object from the first depth information and the second depth information.

The depth recognition apparatus may further include an illuminance sensor configured to sense illuminance of a surrounding area, wherein when a signal sensed by the illuminance sensor is equal to or greater than a given value, the processor may turn off the projector.

When the projector is in an off-state, the processor may be configured to: obtain first image data about the object from a signal that the first sensor outputs when receiving ambient light reflected from the object; obtain second image data about the object from a signal that the second sensor outputs when receiving ambient light reflected from the object; and calculate the depth position of the object from the first image data and the second image data.

The processor may be configured to: turn on the projector and obtain primary-first image data and secondary-first image data from light received at the first and second sensors, respectively; and turn off the projector and obtain primary-second image data and secondary-second image data from light received at the first and second sensors, respectively.

The processor may be configured to: calculate first depth information about the object from the primary-first image data and the secondary-first image data; calculate second depth information about the object from the primary-second image data and the secondary-second image data; and calculate the depth position of the object from the first depth information and the second depth information.

The processor may be configured to: calculate first image data from a difference between the primary-first image data and the primary-second image data; calculate second image data from a difference between the secondary-first image data and the secondary-second image data; and calculate the depth position of the object from the first image data and the second image data.

At least one of the first and second sensors may include: a switchable filter configured to be switched between an infrared-cut mode and an infrared transmission mode; and an image sensor configured to sense light incident thereon after being transmitted by the switchable filter.

The processor may be configured to control the switchable filter such that the switchable filter may block infrared rays in a normal photographic mode and may transmit infrared rays in a depth recognition mode.

BRIEF DESCRIPTION OF THE DRAWINGS

These and/or other example aspects and advantages will become apparent and more readily appreciated from the following description of example embodiments, taken in conjunction with the accompanying drawings in which.

DETAILED DESCRIPTION

Figure 1:
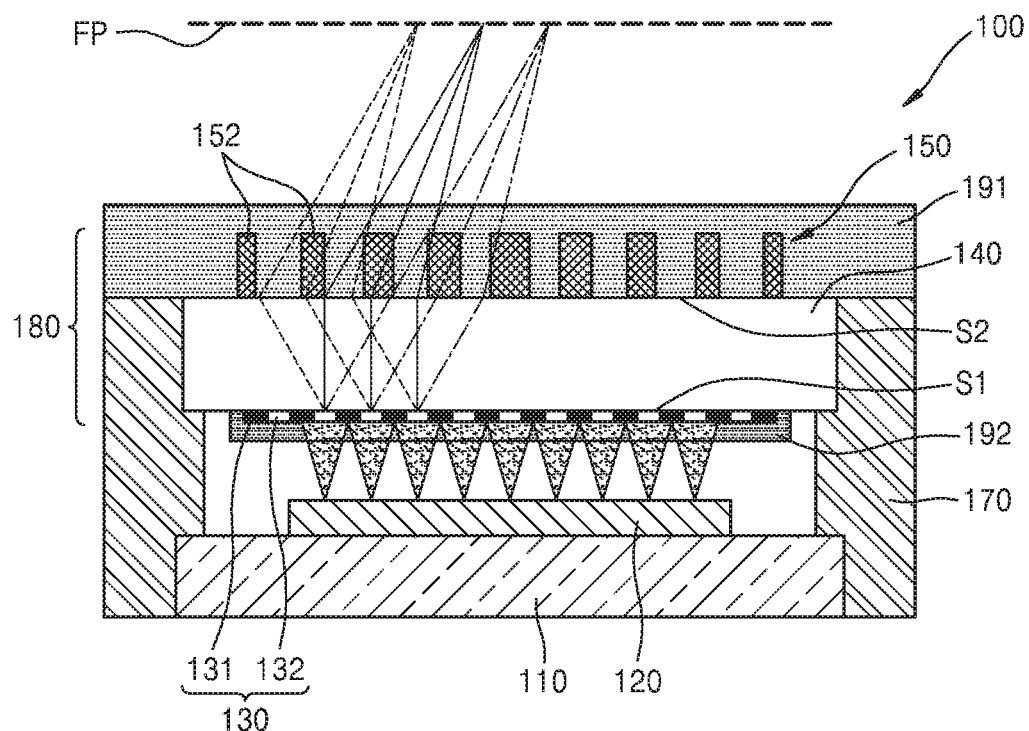
FIG. 1 is a schematic side cross-sectional view of a structure of a projector including a meta-lens, according to an example embodiment.

Hereinafter, example embodiments will be described in detail with reference to the accompanying drawings. In the drawings, thicknesses of layers or regions may be exaggerated for clarity of the specification. The example embodiments of the inventive concept are capable of any of various modifications and may be embodied in many different forms.

It will be understood that when an element or layer is referred to as being "on" or "above" another element or layer, the element or layer may be directly on another element or layer or intervening elements or layers.

FIG. 1 is a schematic side cross-sectional view of a structure of a projector 100 including a meta-lens, according to an example embodiment.

Referring to FIG. 1, the projector 100 includes a light source 120, and a substrate 140 spaced apart from the light source 120 by a predetermined distance. The substrate 140 includes a first surface S1 facing the light source 120 and a second surface S2 opposite the first surface S1. A pattern mask 130 that reflects some light and transmits some of the light is arranged on the first surface S1 such that is contacts the first surface S1. A meta-lens 150 is arranged on the second surface S2. The meta-lens 150 includes nanostructures having a nano size, for example, nano columns 152, and may focus light transmitted through the substrate 140. The substrate 140, the pattern mask 130, and/or the meta-lens 150, together, constitute a lens structure 180. A first protective layer 191 may be formed on the second surface S2 of the substrate 140 to cover the meta-lens 150, thus surrounding the nanostructures. A height of the nano columns 152 may be approximately 0.5 μm. A height of the first protective layer 191 may be greater than the height of the nano columns 152 by approximately 1 μm. A second protective layer 192 may be formed on the first surface S1 of the substrate 140. A thickness of the second protective layer 192 may be approximately 2 μm.

The light source 120 may be a laser diode that emits laser light. The light source 120 may be a surface light-emitting diode. The surface light-emitting diode may be a vertical-cavity surface-emitting laser (VCSEL). For example, the light source 120 may be a VCSEL including a GaAs-based active layer, and may emit laser light of approximately 850 nm or 940 nm. As another example, the light source 120 may emit light of a near-infrared wavelength band.

In the light source 120, light is emitted from a plurality of light-emitting points directly towards the pattern mask 130.

In the light source 120, laser light may be emitted from the light-emitting points arranged in a two-dimensional (2D) array on a surface of a single VCSEL. The light source 120 may include a plurality of VCSELs.

The first surface S1 and the second surface S2 of the substrate 140 may be substantially parallel to each other. However, it is unnecessary that the first surface S1 and the second surface S2 are completely parallel to each other, and may be slanted relative to each other. The substrate 140 may include a transparent material. The term "transparent material" may refer to a material having a high light transmittance, such as fused silica, quartz, a polymer (PMMA etc.), and plastic. The substrate 140 may have a sub-millimeter thickness or a thickness of less than a few millimeters.

The substrate 140 may include a first substrate 141 (refer to FIG. 6) and a second substrate 142 (refer to FIG. 6) that are stacked and bonded together. The first and second substrates 141 and 142 may include the same material or different materials from each other.

The first protective layer 191 and the second protective layer 192 may include a transparent dielectric. For example, The first protective layer 191 and the second protective layer 192 may include a silicon oxide or a polymer.

The pattern mask 130 selectively transmits light incident thereon from the light source 120. The pattern mask 130 includes a first portion 131 that reflects or absorbs incident light and a second portion 132 that transmits incident light. The second portion 132 comprises one or more regions from which a material forming the pattern mask 130 has been removed. The pattern mask 130 may include a metal including Cr or Al, a black matrix, or a polymer. The pattern mask 130 may have a thickness of less than a few hundred nanometers. The second portion 132 may be an image having a predetermined pattern.

Figure 2:
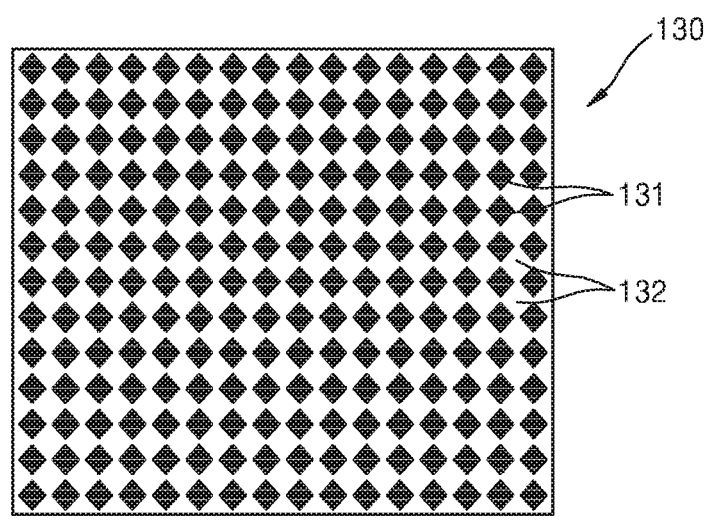
FIG. 2 is a plan view of a pattern mask of a projector according to an example embodiment.

FIG. 2 is a plan view of the pattern mask 130 of FIG. 1.

Referring to FIG. 2, the pattern mask 130 includes a first portion 131 that reflects incident light and a second portion 132 that is a through hole portion surrounded by the first portion 131. The incident light enters the substrate 140 exposed by the second portion 132. The first portion 131 reflects or absorbs incident light. The second portion 132 that surrounds the first portion 131 transmits incident light. Light that has been transmitted through the pattern mask 130 forms an image based on the second portion 132. In FIG. 2, the first portions 131 are arranged in a 2D-array. However, example embodiments are not limited thereto. For example, the second portion 132 may form any of various images. The first portions 131 may be formed with a period of approximately 1 μm-2 μm. The second portions 132 may be formed with a period of approximately 1 μm-2 μm.

The pattern mask 130 may be formed by etching a metal layer, a black matrix layer, or a polymer layer after forming the metal layer, the black matrix layer, or the polymer layer on the first surface S1 of the substrate 140. The pattern mask 130 may be formed in any of various shapes.

The pattern mask 130 converts incident light into structured light having a predetermined pattern and outputs the structured light. When light is incident on the pattern mask 130 from the light source 120, the pattern mask 130 transmits a distribution of rays of light progressing in a space. The rays of light form beam spots with a predetermined angle on a space. The beam spots may have any of various distributions that are determined by detailed conditions of the pattern mask 130. This is referred to as structured light.

The structured light generated in the pattern mask 130 may be a first pattern that is mathematically coded to uniquely form angles and directions of rays of light progressing towards each of a number of predetermined points having location coordinates on a focusing plane FP which will be described below. The shape of the first pattern may be changed upon projection onto an object having a 3D shape, and a second pattern is obtained by imaging the pattern, as projected onto the object, with an image pick-up device, such as a camera. The first pattern and the second pattern are compared and the degrees of shape changes of patterns in each of the coordinates are traced, and thus, depth information of the object having the 3D shape may be obtained.

The meta-lens 150 may include a material having a refractive index greater than that of the substrate 140. For example, the refractive index of the meta-lens 150 is greater than that of the substrate 140 by more than 1. The meta-lens 150 may include single crystal silicon, polycrystalline silicon, amorphous silicon, Si3N4, GaP, TiO2, AlSb, AlAs, AlGaAs, AlGaInP, BP, or ZnGeP2. Also, the meta-lens 150 may include a metal material.

The meta-lens 150 may include a conductive material. The conductive material may be a metal material having conductivity to cause a surface plasmon excitation. For example, the conductive material may include Cu, Al, Ni, Fe, Co, Zn, Ti, ruthenium (Ru), rhodium (Rh), palladium (Pd), Pt, Ag, osmium (Os), iridium (Ir), or Au or an alloy of these materials. Also, the meta-lens 150 may include a 2D material having high conductivity, such as graphene or a conductive oxide. The conductive oxide may include an indium zinc oxide (IZO), an indium tin oxide (ITO) or an aluminum zinc oxide (AZO).

Some of nano columns 152 of the meta-lens 150 may include a dielectric material having a high refractive index and some of the nano columns 152 may include conductive materials.

Figure 3:
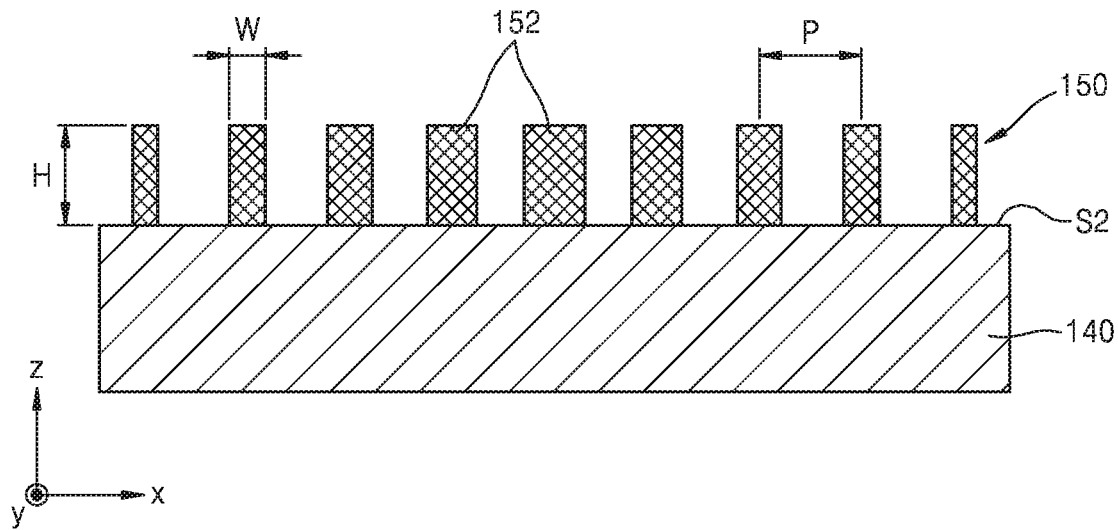
FIG. 3 is a schematic side cross-sectional view of a meta-lens of a projector according to an example embodiment.

FIG. 3 is a schematic side cross-sectional view of the meta-lens 150 of FIG. 1. Referring to FIG. 3, the meta-lens 150 includes a plurality of nanostructures on the second surface S2 of the substrate 140. The nanostructures may be the nano columns 152.

The nano columns 152 have a sub-wavelength dimension that is less than a wavelength A of light emitted from the light source 120. The sub-wavelength dimension is a dimension that defines the shape of the nano columns 152, for example, a height H of the nano columns 152 and a width W of a cross-section of the nano columns 152. Also, an arrangement pitch P of the nano columns 152 has a value less than the wavelength A. In FIG. 3, the nano columns 152 arranged with a constant pitch P are depicted, but example embodiments are not limited thereto. For example, the nano columns 152 may be arranged with an irregular pitch and/or a constant gap therebetween.

The dimension and the pitch P of the arrangement of the nano columns 152 may be less than a half of a wavelength of light emitted from the light source 120. The smaller the pitch P of the nano columns 152 with respect to the wavelength of light emitted from the light source 120, the better the incident light can be controlled to a predetermined shape without performing a high-order diffraction.

A cross-sectional shape of the nano columns 152, that is, the shape of a cross-section parallel to an XY plane, may be any of various shapes, for example, a circular shape, an oval shape, a rectangular shape, a polygonal shape, a cross-shape, a honeycomb shape, or a non-symmetrical shape. Also, all the shapes of the nano columns 152 may be the same, but example embodiments are not limited thereto. The cross-sectional shape of the nano columns 152 may include any of various shapes. The width W of the nano columns 152 may be defined as a diameter of the circular shape, an average diameter of the oval shape, an average length of sides of the rectangular shape, an average diameter of the polygonal shape, a traverse length of the cross-shape, an average diameter of the honeycomb shape, or an average diameter of the non-symmetrical shape. Hereinafter, the dimension of the cross-section is referred to as a "diameter" for convenience.

An aspect ratio of the nano columns 152 may be in a range from about 2 to about 7.

The meta-lens 150 is designed to function as a convex lens or a focusing lens. A shape distribution of the nano columns 152 in FIG. 3 may be determined to perform a function of a convex lens. The shape distribution of the nano columns 152 may be determined so that the nano columns 152 are arranged to have a width that gradually decreases outward with distance from a predetermined reference point. The example shape distribution of the nano columns 152 may be repeated, and a repeating period of the shape distribution may not be constant and may vary.

The meta-lens 150 may focus light emitted from the substrate 140, and may form a focal point on the focusing plane FP spaced apart from the substrate 140 by a predetermined distance. The focusing plane FP may be located at a distance within a range of one or more times a focal distance of the meta-lens 150 to an infinite distance. For example, the focusing plane FP may be located at a distance of several tens of centimeters to several meters from the meta-lens 150. The meta-lens 150 focuses incident structured light SL having a predetermined pattern and projects the structured light SL onto the focusing plane FP. The structured light SL incident on the focusing plane FP may be an image pattern coded so as to form angles and directions of rays of light directed towards each of a number of predetermined points having location coordinates on the focusing plane. The shape of the image pattern may be changed upon projection onto a 3D object. The output image pattern is compared with an image pattern as reflected by the object, wherein the image pattern reflected by the 3D object is imaged by an image capture device, such as a camera, and thus, depth information of the 3D object may be obtained.

The nano columns 152 described above may have unique values of transmission intensities and transmission phases according to a material thereof and a shape of each of the nano columns 152. By determining shape distributions of the nano columns 152, a phase or intensity of light transmitted through the meta-lens 150 may be controlled. Hereinafter, the term "shape distribution" may refer to at least one of the shapes of the nano columns 152, the dimensions of the nano columns 152, the size distributions of the nano columns 152, the arrangement pitch of the nano columns 152, and/or the distribution of the arrangement pitch of the nano columns 152.

The nano columns 152 depicted in FIG. 3 have the same height in an example, but are not limited thereto. For example, a desired transmission intensity distribution or a desired transmission phase distribution may be formed by determining the size in a horizontal direction or a vertical direction according to locations of nano columns 152 or constituent materials of nano columns 152. In order to form a desired transmission intensity distribution or a desired transmission phase distribution, a shape distribution of the nano columns 152 according to locations may be determined with respect to a predetermined group including a plurality of nano columns 152. Also, the nano column group formed in this manner may be repeatedly arranged with a predetermined period. The shape distribution of the nano columns 152 may be regular, periodic, or pseudo-periodic, but is not limited thereto, that is, it may be random.

The nano columns 152 of the meta-lens 150 have a very small pitch and a very small thickness as compared to a micro optical part of the related art, and thus, may form an arbitrary pattern without high-order diffraction with respect to a wide angle range. Accordingly, the projector 100 may have a subminiature size. For example, a height of the projector 100 may be less than 4 mm.

Figure 4:
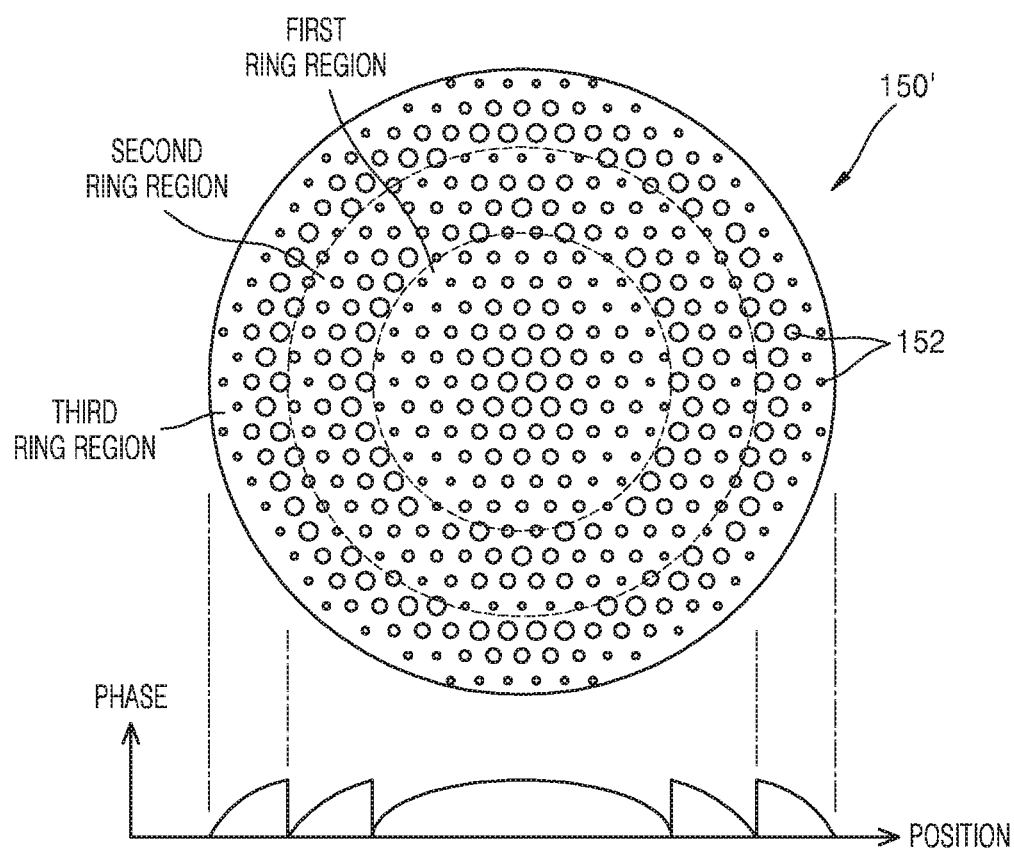
FIG. 4 is a schematic plan view of a meta-lens of a projector according to another example embodiment.

FIG. 4 is a schematic plan view of a meta-lens 150' according to another example embodiment. Referring to FIG. 4, the meta-lens 150' may be a meta-surface including a plurality of nano columns 152 on the substrate 140 (refer to FIG. 1).

The meta-lens 150' may be a Fresnel lens. In FIG. 4, a lower part shows a side cross-sectional view of the Fresnel lens corresponding to the meta-lens 150'. The meta-lens 150' includes a plurality of the nano columns 152 arranged in a 2D array and is manufactured by a semiconductor process, and thus, the miniaturization of the meta-lens 150' is possible.

The nano columns 152 of the meta-lens 150' may be arranged to be symmetric with respect to a center in order to function as a focusing optical device. For example, referring to FIG. 4, in order to function as a Fresnel lens, the meta-lens 150' may include a plurality of ring regions. Diameters of the nano columns 152 of each of the ring regions gradually decrease with distance from the center of a first ring region. For example, the meta-lens 150' may include first through third ring regions, in order with distance from the center of the meta-lens 150'. However, example embodiments are not limited thereto. For example, the meta-lens 150' may further include more than three ring regions.

Referring back to FIG. 1, the projector 100 may be an integrated module. That is, the projector 100 may further include a supporter 110 for supporting the light source 120 and a housing 170 that fixes the substrate 140.

The projector 100 according to an example embodiment uses a meta-lens 150 instead of a lens module including a plurality of lenses of the related art. Therefore, miniaturization of the projector 100 is possible. Also, a process for aligning a plurality of lenses of the lens module is unnecessary, the manufacturing process may be simplified.

The projector 100 according to an example embodiment may project an image of the pattern mask 130 onto the focusing plane FP, and also, may be used for illumination.

Also, the projector 100 according to an example embodiment projects an image, formed by structured light, onto an object, and captures an image reflected by the object, and thus, may be used as a light irradiation apparatus of a depth sensor. When capturing light reflected by an object after outputting an image formed by structured light, more correct depth information may be obtained as compared to a case when capturing light reflected by an object after outputting general light.

Figure 5:
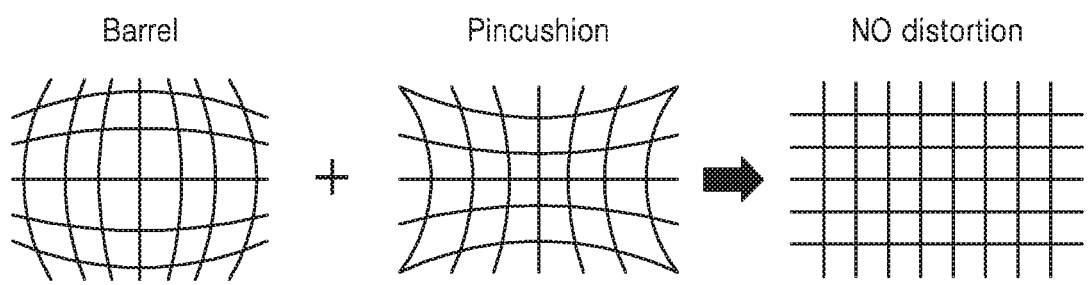
FIG. 5 is a schematic diagram for explaining a method of reducing or preventing image distortion of a projector, according to an example embodiment.

FIG. 5 is a schematic diagram for explaining a method of reducing or preventing an image distortion of the projector 100 according to an example embodiment.

An image which is an exposed region of a pattern mask is designed to include a barrel distortion in advance. The barrel distortion is designed to compensate for a pincushion distortion in a meta-lens. Accordingly, an image projected to a focusing plane may be an image of no distortion.

Figure 6:
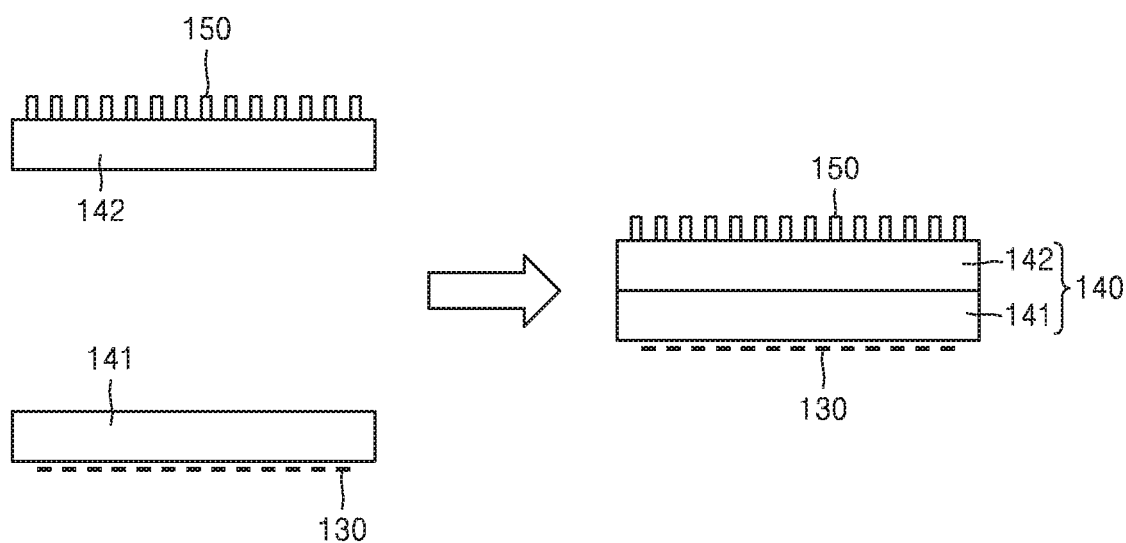
FIG. 6 is a diagram for explaining a method of manufacturing a lens structure of a projector, according to an example embodiment.

FIG. 6 is a diagram for explaining a method of manufacturing a lens structure 180 according to an example embodiment. Like reference numerals are used for elements that are substantially identical to the elements of FIG. 1, and the descriptions thereof will be omitted.

Referring to FIG. 6, a first layer including a metal layer, a black matrix layer, and a polymer layer is formed on a first substrate 141. Next, a pattern mask 130 is formed by patterning the first layer.

A second layer including a material for forming a meta-lens is formed on a second substrate 142. A meta-lens 150 is formed on the second substrate 142 by pattering the second layer.

Next, when the first substrate 141 and the second substrate 142 are bonded to be in contact with each other, a lens structure 180 on which the pattern mask 130 and the meta-lens 150 are respectively formed on opposite surfaces of the substrate 140 may be formed.

The method of manufacturing a lens structure 180 according to an example embodiment does not require an additional aligning process, and thus, the manufacturing of the lens structure 180 may be comparatively easy and the yield of manufacturing the lens structure 180 may be comparatively increased.

Figure 7:
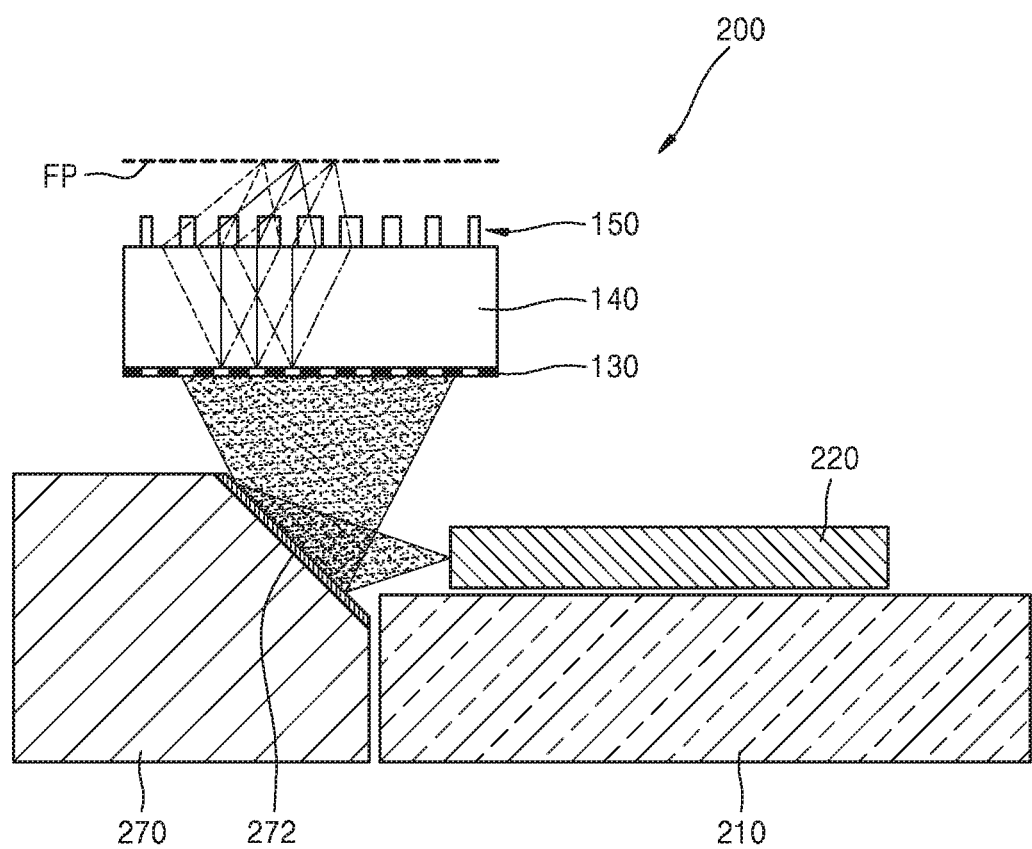
FIG. 7 is a schematic side cross-sectional view of a structure of a projector including a meta-lens, according to another example embodiment.

FIG. 7 is a schematic side cross-sectional view of a structure of a projector 200 including a meta-lens according to another example embodiment. Like reference numerals are used for elements that are substantially identical to the elements of FIG. 1, and the descriptions thereof will be omitted.

Referring to FIG. 7, the projector 200 includes an edge emitting diode as a light source 220 on a supporter 210. The light source 220 may be a Fabry-Perot laser diode or a DFB laser diode.

The substrate 140 is spaced apart from the light source 220 by a predetermined distance. The substrate 140 includes a first surface S1 (refer to FIG. 1) facing the light source 220 and a second surface S2 (refer to FIG. 1) opposite the first surface S1. The pattern mask 130 that reflects some light, and outputs some light as structured light and transmits the structured light is attached to the first surface S1 of the substrate 140. The meta-lens 150 is arranged on the second surface S2. The meta-lens 150 includes nano columns 152 having a nano size, and may focus light, transmitted through the substrate 140, onto the focusing plane FP. For example, the focusing plane FP may be located at a distance of several tens of centimeters to several meters from the meta-lens 150.

A first protective layer (refer to the first protective layer 191 of FIG. 1) may be formed on the second surface S2 of the substrate 140 to cover the pattern mask 130. A second protective layer (refer to the second protective layer 192 of FIG. 1) may be formed on the first surface S1 of the substrate 140. The first protective layer 191 and the second protective layer 192 are not shown in FIG. 7 for convenience.

A path change member 270 that changes a path of light emitted from the light source 220 may be arranged on a side of the light source 220. The path change member 270 may include a reflection surface 272 that reflects light emitted from the light source 220 with a predetermined angle.

The reflection surface 272 of the path change member 270 may be a mirror coating. The reflection surface 272 is disposed to bend an optical path to a predetermined angle considering a relative location of the pattern mask 130 with respect to a light emission surface of the light source 220. In FIG. 7, it is depicted as the optical axis is bent in a vertical direction.

The pattern mask 130 and the meta-lens 150 respectively attached to the first and second surfaces S1 and S2 of the substrate 140 may be the same as the pattern mask 130 and the meta-lens 150 of FIG. 1. The pattern mask 130 and the meta-lens 150 of the projector 200 according to the present example embodiment may use the same pattern mask and the meta-lens designed in advance regardless of the types of light sources, for example, a surface emitting diode or an edge emitting diode.

The projector 200 uses an edge emitting diode as the light source 220 and the path change member 270 may be designed as necessary to adapt to a location between the light source 220 and the substrate 140. Also, when compared the projector 200 with the projector 100, a gap between the substrate 140 and the light source 220 may be made narrower in the projector 200 than in the projector 100, thus, the miniaturization of the projector 200 may be further achieved.

The lens structure 180 including the pattern mask, the substrate, and the meta-lens according to the present example embodiment may be used regardless of the types of light sources.

Figure 8:
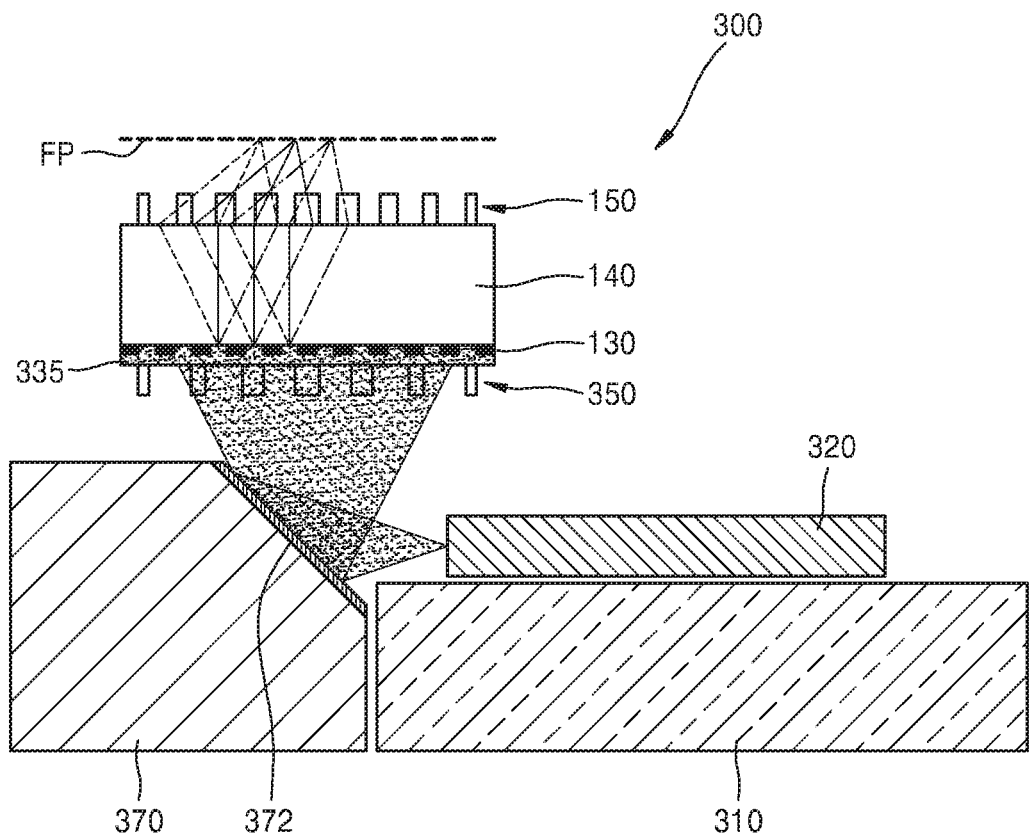
FIG. 8 is a schematic side cross-sectional view of a structure of a projector including a meta-lens, according to another example embodiment.

FIG. 8 is a schematic side cross-sectional view of a structure of a projector 300 including a meta-lens according to another example embodiment. Like reference numerals are used for elements that are substantially identical to the elements of FIGS. 1 and 7, and the descriptions thereof will be omitted.

Referring to FIG. 8, the projector 300 includes an edge emitting diode as a light source 320 on a supporter 310. A substrate 140 is spaced apart from the light source 320 by a predetermined distance. The substrate 140 includes a first surface S1 (refer to FIG. 1) facing the light source 320 and a second surface S2 (refer to FIG. 1) opposite the first surface S1. A pattern mask 130 that reflects some light, and converts some light into structured light and transmits the structured light is attached to the first surface S1 of the substrate 140. The meta-lens 150 is arranged on the second surface S2 of the substrate 140. The meta-lens 150 may include nano columns 152 (refer to FIG. 1) having a nano size and may focus light, that has been transmitted through the substrate 140, onto the focusing plane FP. For example, the focusing plane FP may be located at a distance of several tens of centimeters to several meters from the meta-lens 150.

Figure 9:
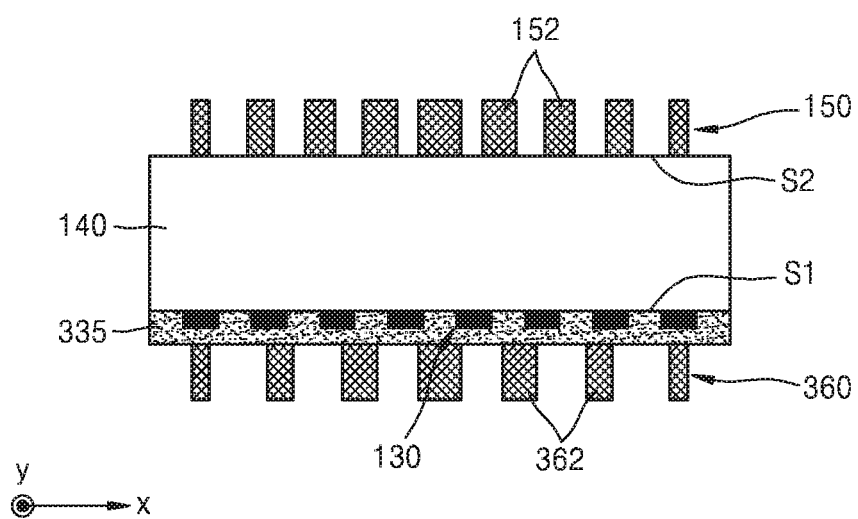
FIG. 9 is a magnified side cross-sectional view of a lens structure of FIG. 8.

FIG. 9 is a magnified side cross-sectional view of a lens structure of FIG. 8. Referring to FIG. 9, the pattern mask 130 that reflects some light and transmits some light is attached to the first surface S1 of the substrate 140. A protective layer 335 covering the pattern mask 130 is formed on the first surface S1 of the substrate 140. The protective layer 335 may include a material having a refractive index lower than that of a second meta-lens 360 which will be described below. For example, the refractive index of the protective layer 335 may be less than that of the second meta-lens 360 by more than 1. The protective layer 335 may have a thickness sufficient to completely cover the pattern mask 130, for example, approximately 2 μm. The protective layer 335 may include a silicon oxide or a polymer. The protective layer 335 provides a flat surface for forming the second meta-lens 360.

A first protective layer (refer to the first protective layer 191 of FIG. 1) may be formed on the second surface S2 of the substrate 140 to cover the meta-lens 150. The first protective layer 191 are not shown in FIG. 9 for convenience.

The second meta-lens 360 is formed on the protective layer 335. The second meta-lens 360 may include a plurality of second nanostructures. The second meta-lens 360 may include a plurality of nano columns 362 like the meta-lens 150. The second meta-lens 360 may be a collimating lens that collimates incident light.

Also, the second meta-lens 360 may include a plurality of cylindrical lenses or semi-cylindrical lenses. An edge emitting diode used as the light source 320 emits light having a large diffusion angle. The light source 320 may emit spot light in which a diameter of a long axis (an x-axis) is greater than a short axis (a y-axis). Accordingly, light that has been transmitted through the pattern mask 130 may diverge in an undesired angle, and thus, effective light may be reduced.

Figure 10:
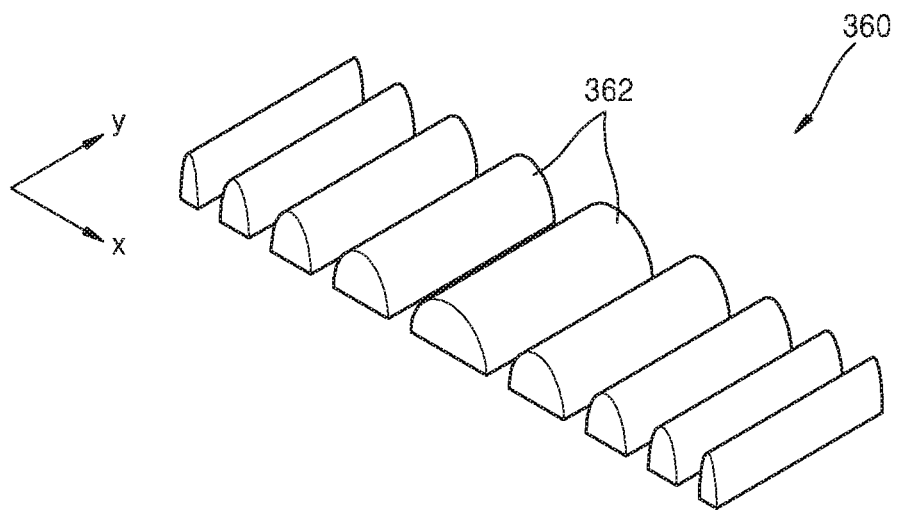
FIG. 10 is a perspective view showing an example of a second meta-lens of a projector, according to an example embodiment.

The cylindrical lens and the semi-cylindrical lens may be lenses on which a curved surface is formed with respect to the long axis (the x-axis) of emitted light. FIG. 10 shows an example of the second metal-lens 360 including a plurality of semi-cylindrical lenses 362. In FIG. 10, the second meta-lens 360 having 9 cylindrical lenses 362 is depicted, but the second meta-lens 360 according to example embodiments is not limited thereto. The second meta-lens 360 may be a lens in which a semi-cylindrical set of FIG. 10 is repeated in an x-direction and a y-direction.

The projector 300 according to example embodiments may reduce light loss as compared to the projector 200 since light incident to the second meta-lens 360 is collimated.

Figure 11:
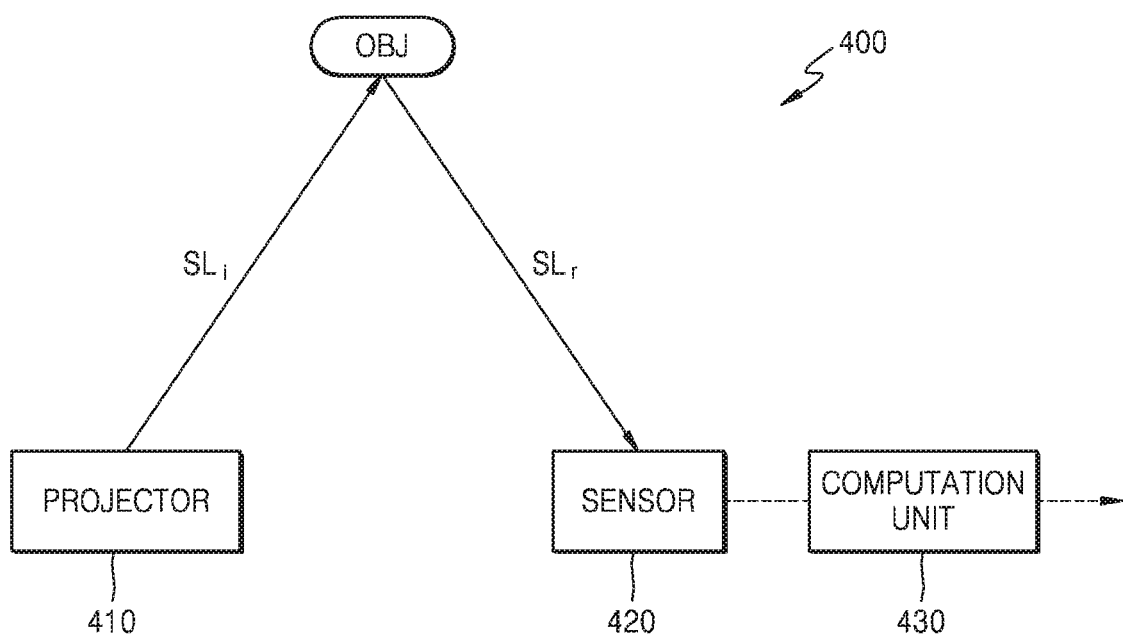
FIG. 11 is a block diagram showing a schematic configuration of a depth recognition apparatus according to an example embodiment.

FIG. 11 is a block diagram showing a schematic configuration of a depth recognition apparatus 400 according to an example embodiment.

The depth recognition apparatus 400 includes a projector 410 configured to output structured light SLi to an object OBJ, a sensor 420 that receives the structured light SLr reflected from the object OBJ, and a computation unit 430 configured to compute a depth location of the object OBJ by comparing the structured light SLi t output from the projector 410 and the structured light SLr received by the sensor 420.

The projector 410 converts light emitted from a light source into a structured light pattern and outputs the structured light pattern, and may be one of the projectors 100, 200, and 300 according to the example embodiments described above.

The sensor 420 senses the structured light SLr reflected by the object OBJ. the sensor 420 may include an array of optical detection elements. The sensor 420 may further include a dispersing element for analyzing light reflected by the object OBJ for each wavelength.

The computation unit 430 obtains depth information with respect to the object OBJ by comparing structured light SLi irradiated onto the object OBJ and structured light SLr reflected by the object OBJ, and may analyze a 3D shape, location, and movement of the object OBJ. The structured light SLi generated by the projector 410 may be a pattern mathematically coded to uniquely form angles and directions of rays progressing towards predetermined points having location coordinates on a focusing plane FP. When the coded pattern is reflected by the object OBJ, a pattern of reflected structured light SLr has a changed shape from the pattern of output structured light SLi. Depth information of the object OBJ may be obtained by comparing the patterns and tracing the patterns in each of the coordinates. From this result, three-dimensional information related to the shape and movement of the object OBJ may be obtained.

Optical elements for controlling direction of the structured light SLi emitted from the projector 410 to progress towards the object OBJ or additional modulation may further be arranged between the projector 410 and the object OBJ.

Also, the depth recognition apparatus 400 may further include a controller that controls driving one or more light sources included in the projector 410 and/or operations of the sensor 420. Also, the depth recognition apparatus 400 may further include a memory for storing a computation program to be performed in the computation unit 430 for obtaining the 3D information. The computation unit 430 may be a processor and its functionality implemented by software and/or hardware.

A result of computation in the computation unit 430, that is, information about the shape and location of the object OBJ may be transmitted to another unit. For example, the above information may be transmitted to a controller of an electronic device employed in the depth recognition apparatus 400. The other unit to which the result is transmitted may be a display or a printer that outputs the result. Besides above, the other unit may include a smart phone, a mobile phone, a personal digital assistance (PDA), a laptop, a personal computer PC, a wearable device, and other mobile or non-mobile devices, but is not limited thereto.

The depth recognition apparatus 400 may be used as a sensor that precisely acquires 3D information with respect to an object OBJ, and thus, may be employed in any of various electronic devices. The electronic device may be autonomous driving equipment, for example, an autonomous car, a driverless car, a robot, a drone, etc. Besides above, the electronic device may be a mobile communication device or an internet of things (IOT) device.

Figure 12:
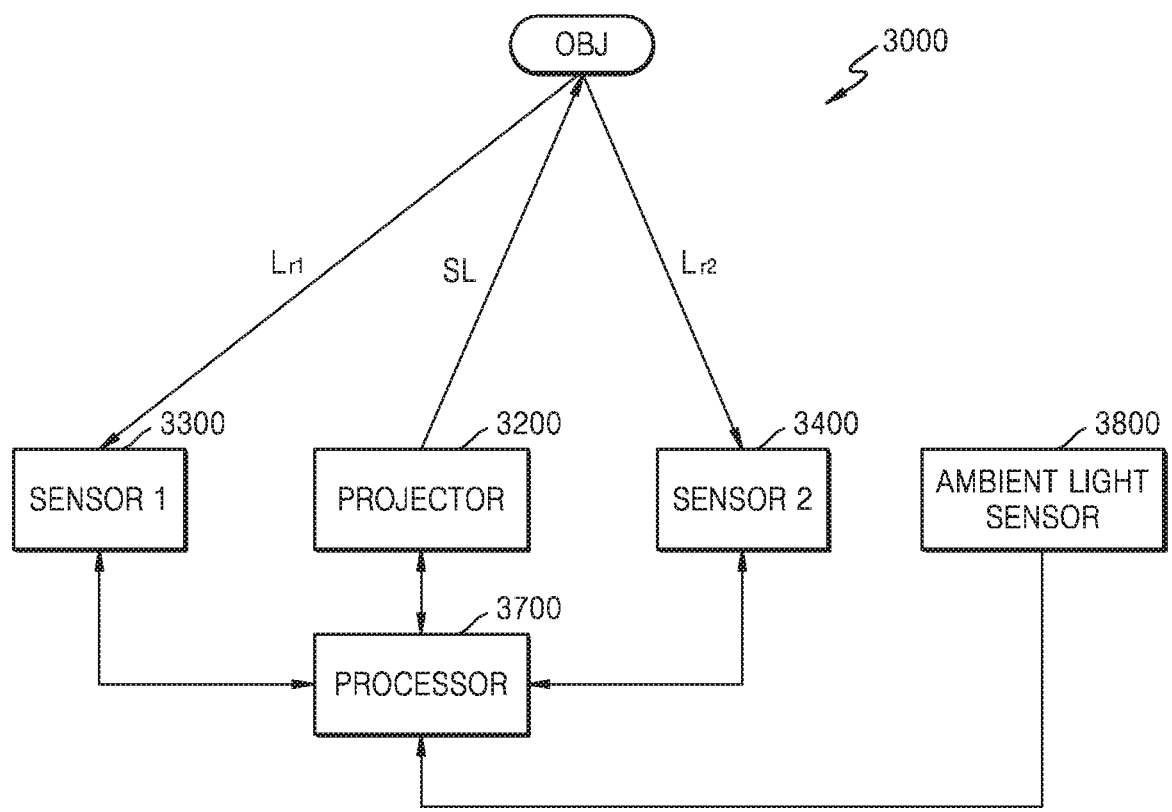
FIG. 12 is a block diagram illustrating a schematic configuration of a depth recognition apparatus according to some example embodiments.

FIG. 12 is a block diagram illustrating a schematic configuration of a depth recognition apparatus 3000 according to one or more example embodiments;

The depth recognition apparatus 3000 includes a projector 3200 configured to emit structured light SL toward an object OBJ, first and second sensors 3300 and 3400 placed at different positions with respect to the projector 3200 and configured to sense light coming from the object OBJ, and a processor 3700 configured to calculate a depth position of the object OBJ by analyzing light received by at least one of the first and second sensors 3300 and 3400.

The projector 3200 may convert light emitted from an edge emitting device into structured light having a predetermined pattern and may output the structured light. The projector 3200 may include any one of the projectors 100, 101, and 102 of the above-described example embodiments or a combination thereof.

Each of the first and second sensors 3300 and 3400 may include an array of light detecting elements. The first and second sensors 3300 and 3400 are placed at different positions relative to the projector 3200, and thus when the first and second sensors 3300 and 3400 sense light coming from the object OBJ, image information of different positions is obtained. In some example embodiments, thus, accuracy may be improved as compared to the above-described embodiments in which only one sensor is used, and information about the depth of the object OBJ may be obtained by any of various methods according to usage environments. For example, the processor 3700 may analyze structured light SL which is emitted from the projector 3200 and reflected from the object OBJ. Alternatively, when the illuminance of ambient light is proper, the projector 3200 may be omitted, and the processor 3700 may analyze ambient light reflected from the object OBJ.

In addition, the depth recognition apparatus 3000 may further include an ambient light sensor 3800. The ambient light sensor 3800 may sense the intensity of ambient light, and when the magnitude of a signal sensed by the ambient light sensor 3800, for example, the intensity of infrared rays included in the ambient light, is equal to or greater than a given value, the processor 3700 may turn off the projector 3200 and analyze ambient light reflected from the object OBJ to calculate information about the depth of the object OBJ. Various modes in which the processor 3700 operates to obtain depth information will be described later with reference to FIGS. 18 to 24.

Figure 16:
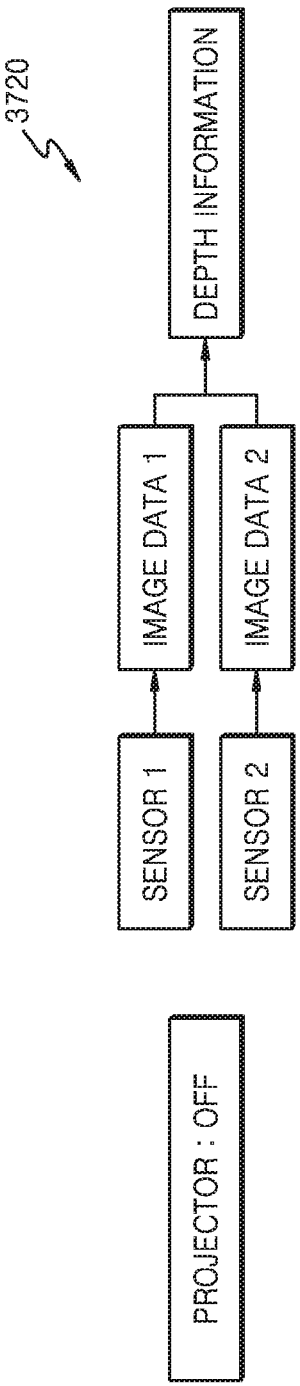

The first sensor 3300, the projector 3200, and the second sensor 3400 may be arranged in a line at given intervals. In FIG. 16, the projector 3200 is placed between the first and second sensors 3300 and 3400. However, this is a non-limiting example.

Figure 13A:
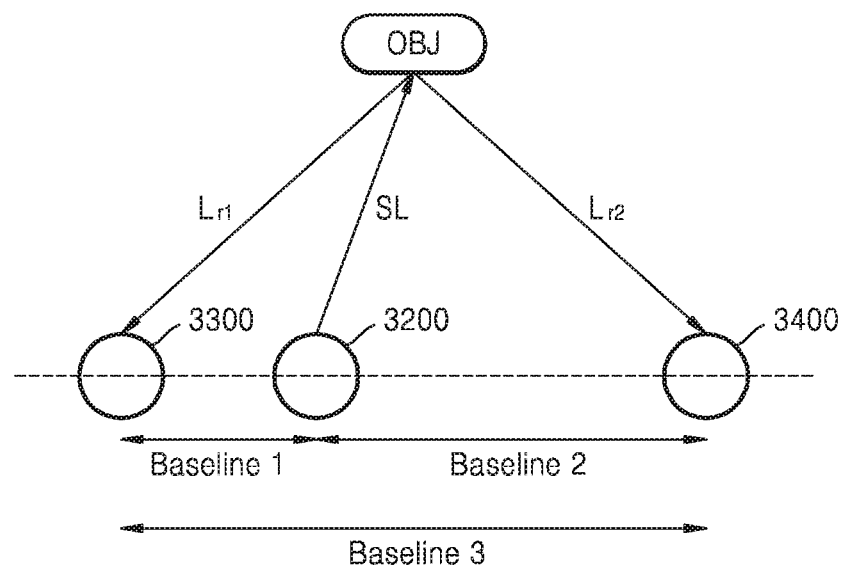
FIGS. 13A to 13C are views illustrating example arrangements of a plurality of sensors and a projector in the depth recognition apparatus shown in FIG. 15.
Figure 13B:
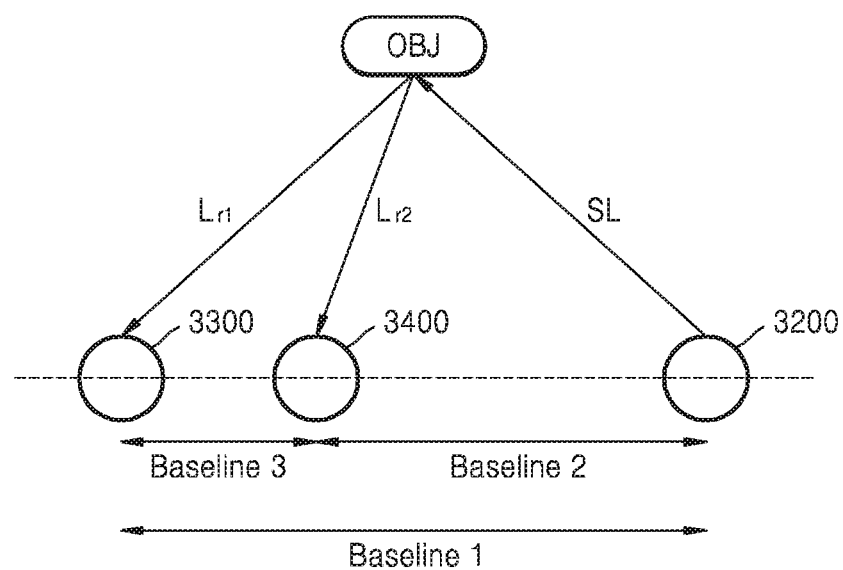
Figure 13C:
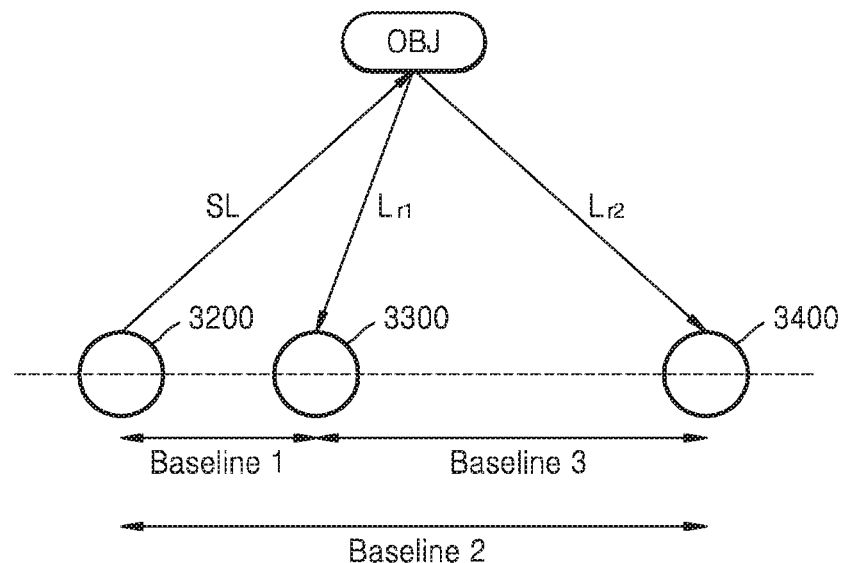

FIGS. 13A to 13C are views illustrating example arrangements of the first and second sensors 3300 and 3400 and the projector 3200 in the depth recognition apparatus 3000 shown in FIG. 12.

When the distance between the first sensor 3300 and the projector 3200, the distance between the second sensor 3400 and the projector 3200, and the distance between the first and second sensors 3300 and 3400 are indicated by baseline 1, baseline 2, and baseline 3, respectively, there may be various combinations with baselines 1, 2, and 3 having any of various values.

Referring to FIG. 13A, the projector 3200 and the first and second sensors 3300 and 3400 may be arranged such that the projector 3200 may be placed between the first and second sensors 3300 and 3400 in a condition of baseline 1<baseline 2<baseline 3.

Referring to FIG. 13B, the projector 3200 and the first and second sensors 3300 and 3400 may be arranged such that the second sensor 3400 may be placed between the projector 3200 and the first sensor 3300 in a condition of baseline 3<baseline 2<baseline 1.

Referring to FIG. 13C, the projector 3200 and the first and second sensors 3300 and 3400 may be arranged such that the first sensor 3300 may be placed between the projector 3200 and the second sensor 3400 in a condition of baseline 1<baseline 3<baseline 2.

Figure 14:
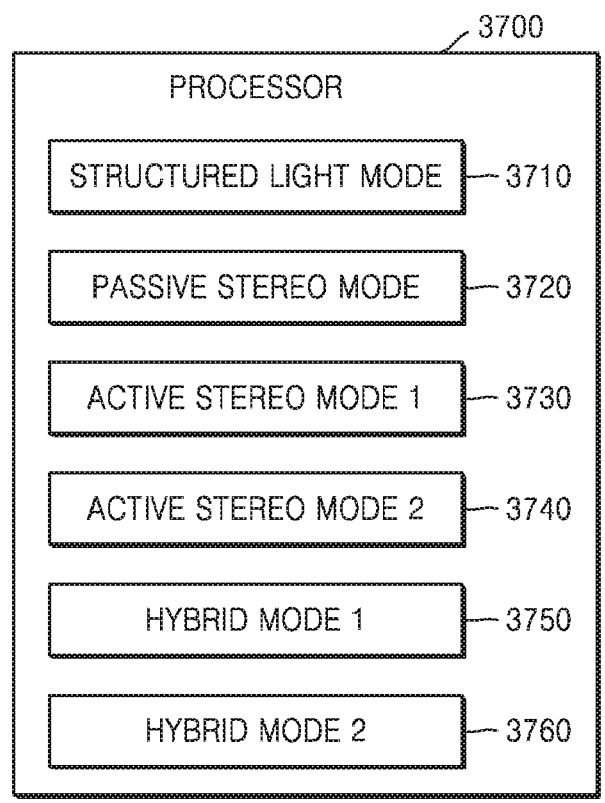
FIG. 14 is a view illustrating modes in which a processor of the depth recognition apparatus shown in FIG. 12 operates.

FIG. 14 is a view illustrating modes in which the processor 3700 of the depth recognition apparatus 3000 shown in FIG. 12 operates. FIGS. 15 to 20 are block diagrams illustrating operations and processing in the example execution modes shown in FIG. 14.

The processor 3700 may operate selectively in one of a structured light mode 3710, a passive stereo mode 3720, a first active stereo mode 3730, a second active stereo mode 3740, a first hybrid mode 3750, and a second hybrid mode 3760.

A program for operations in the different modes may be stored in a memory, and the processor 3700 may execute the program.

The processor 3700 may select one of the modes and operate in the selected mode according to a user's input or a control signal from another execution module.

Figure 15:
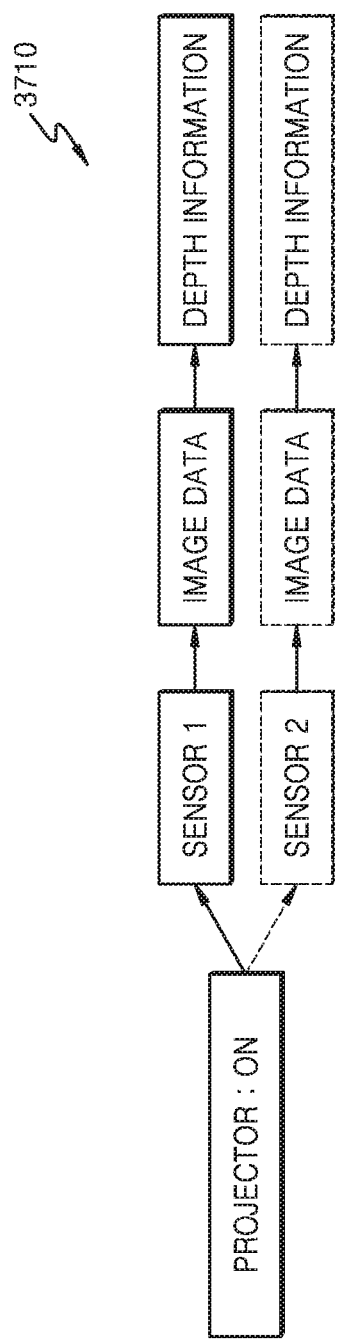
FIGS. 15 to 20 are block diagrams illustrating operations and processing in the example execution modes shown in FIG. 14.

Referring to FIG. 15, in the structured light mode 3710, a projector is controlled to be turned on. That is, the projector emits structured light toward an object, and one of first and second sensors receives light reflected from the object. Image data obtained using the one of the first and second sensors may be compared with the pattern of the structured light emitted by the projector and may be analyzed to obtain depth information about the object. The one of the first and second sensors to be used for depth information analysis may be determined according to usage environments. For example, the one of the first and second sensors resulting in a better image may be selected according to the position of the object.

Referring to FIG. 16, in the passive stereo mode 3720, the projector is controlled to be turned off. That is, the projector does not emit structured light toward the object. This mode may be used when the intensity of ambient light is sufficient.

Image data 1 about the object may be obtained from a signal that the first sensor outputs when receiving ambient light reflected from the object, image data 2 about the object may be obtained from a signal that the second sensor outputs when receiving ambient light reflected from the object, and depth information about the object may be obtained from the image data 1 and the image data 2.

Figure 17:
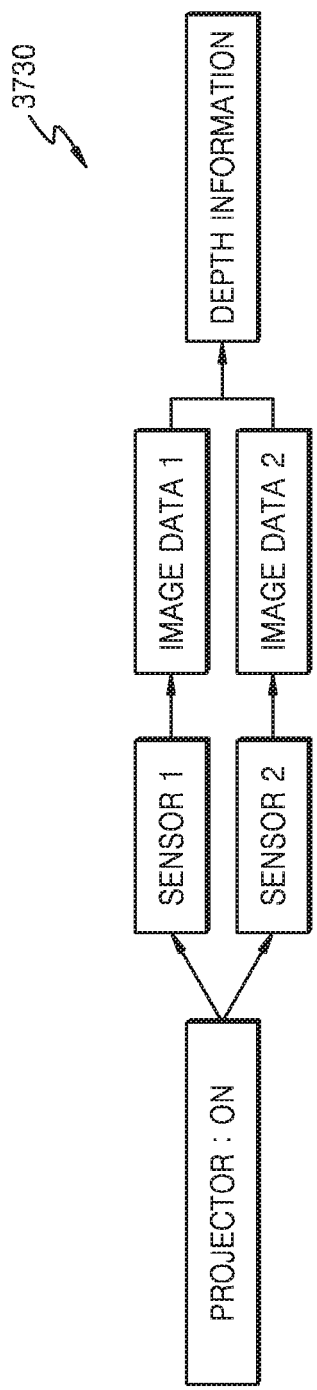

Referring to FIG. 17, in the first active stereo mode 3730, the projector is controlled to be turned on. That is, the projector emits structured light toward the object, and both the first and second sensors receive light reflected from the object. Image data 1 obtained using the first sensor and image data 2 obtained using the second sensor are image data from different view points and may be analyzed to obtain depth information about the object.

Figure 18:
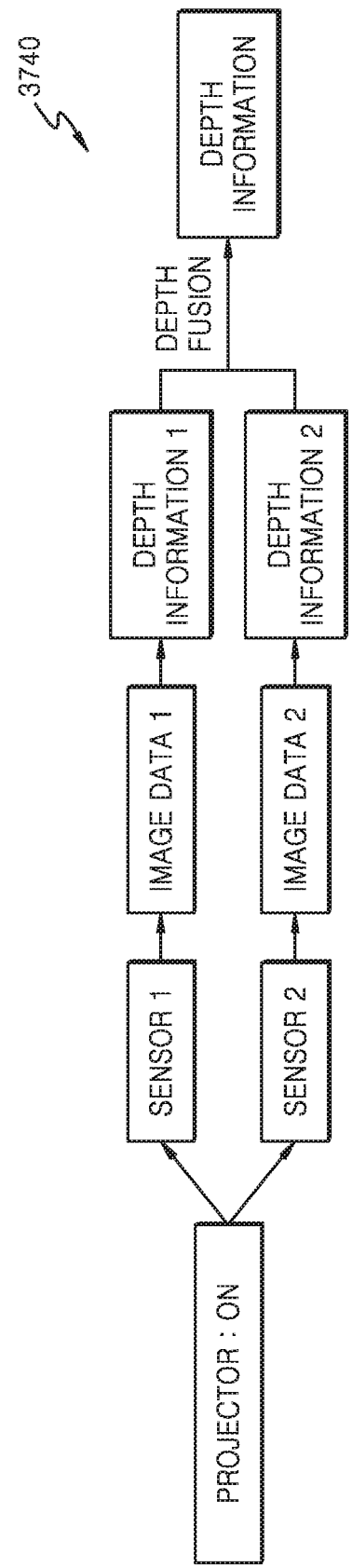

Referring to FIG. 18, in the second active stereo mode 3740, the projector is controlled to be turned on. That is, the projector emits structured light toward the object, and both the first and second sensors receive light reflected from the object. Image data 1 is obtained from the first sensor that receives structured light emitted by the projector and reflected from the object, and depth information 1 may be obtained from the image data 1. In the same manner, depth information 2 may be obtained from image data 2 of the second sensor. The depth information 1 and the depth information 2 may be combined to obtain final depth information, and the final depth information may be more accurate than the depth information obtained using only one of the first and second sensors in the structured light mode 3710 described with reference to FIG. 15.

Figure 19:
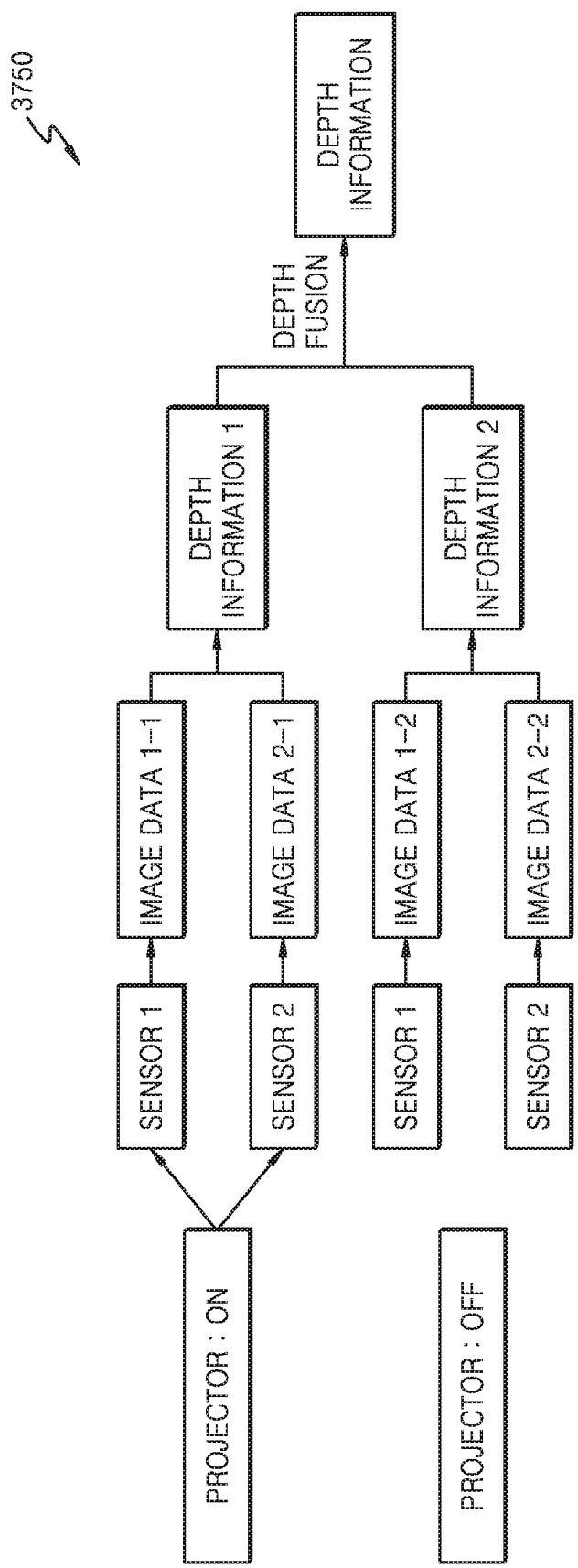

Referring to FIG. 19, in the first hybrid mode 3750, the projector is controlled to be alternately turned on and off to obtain depth information 1 and depth information 2 in the respective states, and the depth information 1 and the depth information 2 are combined to obtain final depth information.

The projector is controlled to be turned on, and image data 1-1 and image data 2-1 are respectively obtained from light received at the first sensor and light received at the second sensor. The depth information 1 about the object is calculated from the image data 1-1 and the image data 2-1. The depth information 1 may be obtained in the same manner as the depth information is obtained in the first active stereo mode 3730 described with reference to FIG. 17. However, the depth information 1 is not limited thereto. For example, the depth information 1 may be obtained in the same manner as the depth information is obtained in the second active stereo mode 3740 described with reference to FIG. 18.

In addition, the projector is controlled to be turned off, and image data 1-2 and image data 2-2 are respectively obtained from light received at the first sensor and light received at the second sensor. The depth information 2 about the object is calculated from the image data 1-2 and the image data 2-2. The depth information 2 may be obtained in the same manner as the depth information is obtained in the passive stereo mode 3720 described with reference to FIG. 16.

Next, the depth information 1 and the depth information 2 are combined to obtain the final depth information.

Figure 20:
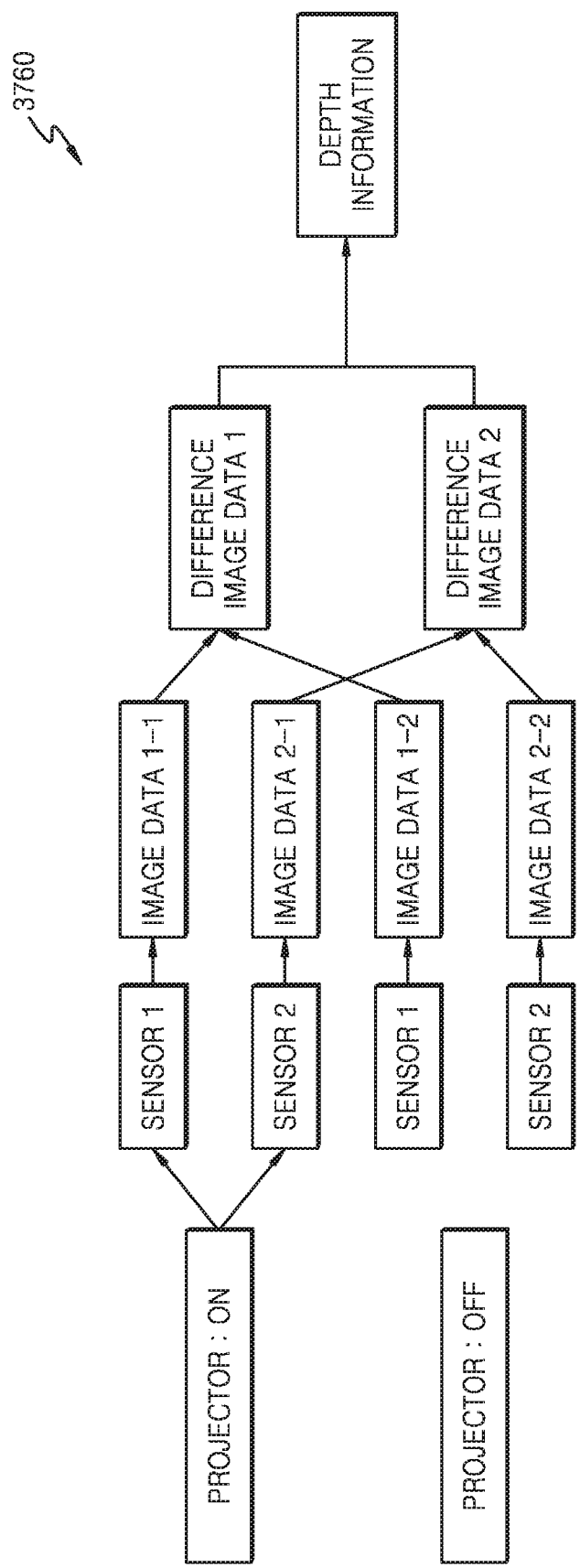

Referring to FIG. 20, in the second hybrid mode 3760, the projector is controlled to be alternately turned on and off to obtain difference image data 1 and difference image data 2 in the respective states, and the difference image data 1 and the difference image data 2 are combined to obtain final depth information.

The projector is controlled to be turned on, and image data 1-1 and image data 2-1 are respectively obtained from light received at the first sensor and light received at the second sensor. In addition, the projector is controlled to be turned off, and image data 1-2 and image data 2-2 are respectively obtained from light received at the first sensor and light received at the second sensor.

The difference image data 1 is calculated from the difference between the image data 1-1 and the image data 1-2, and the difference image data 2 is calculated from the difference between the image data 2-1 and the image data 2-2.

To obtain the difference image data 1, for example, a matrix formed of image data 1-2, {image data 1-2}, that is obtained using the first sensor when the projector is turned off may be subtracted from the matrix formed of image data 1-1, {image data 1-1}, that is obtained using the first sensor when the projector is turned on. In other words, the difference image data 1 is obtained using the first sensor from light which is reflected from the object and involves only structured light without the influence of ambient light.

In the same manner, to obtain the difference image data 2, a matrix formed of image data 2-2, {image data 2-2}, that is obtained using the second sensor when the projector is turned off may be subtracted from the matrix formed of image data 2-1, {image data 2-1} that is obtained using the second sensor when the projector is turned on. In other words, the difference image data 2 is obtained using the second sensor from light which is reflected from the object and involves only structured light without the influence of ambient light.

The difference image data 1 and the difference image data 2 are data obtained using the first and second sensors placed at different view points, and may be used to calculate depth information about the object.

Figure 21:
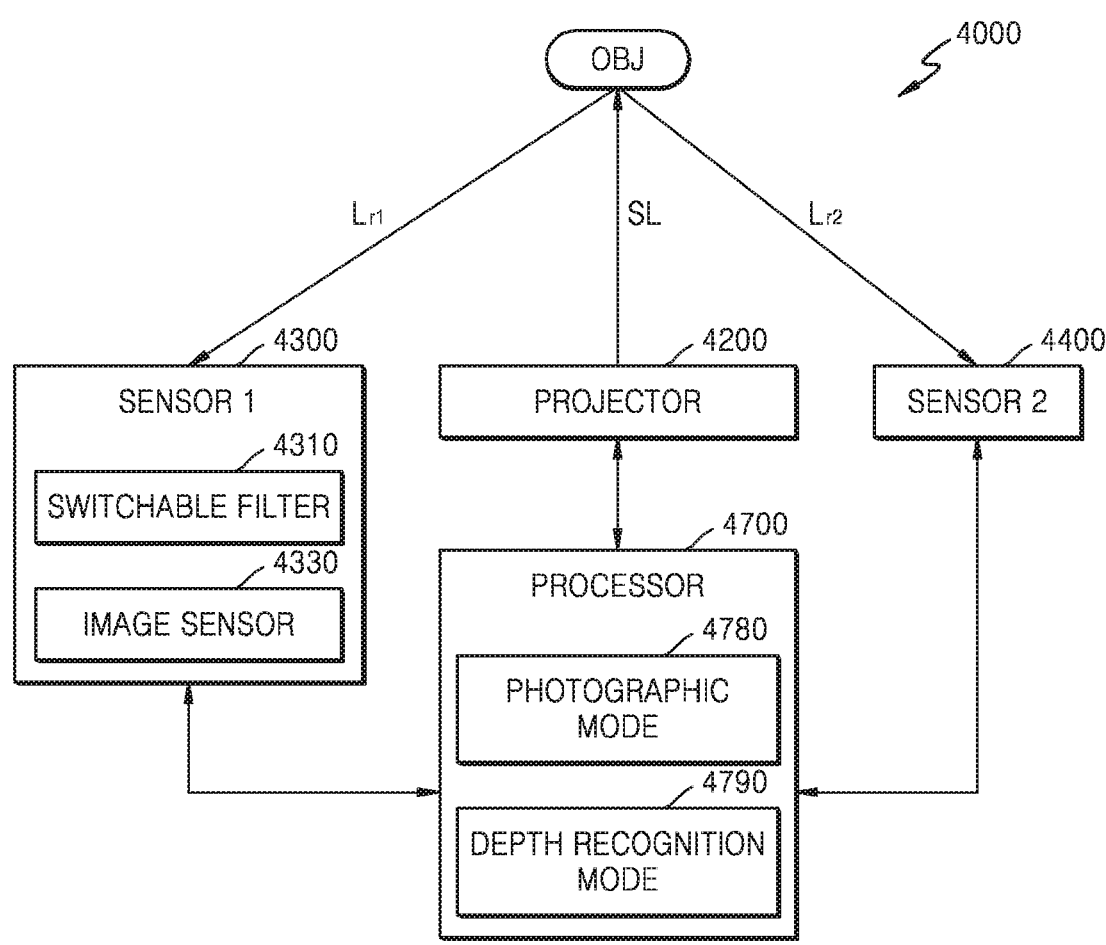
FIG. 21 is a block diagram illustrating a schematic configuration of a depth recognition apparatus according to some example embodiments.

FIG. 21 is a block diagram illustrating a schematic configuration of a depth recognition apparatus 4000 according to some example embodiments.

The depth recognition apparatus 4000 includes a projector 4200, a first sensor 4300, a second sensor 4400, and a processor 4700.

The projector 4200 may convert light emitted from an edge emitting device into structured light having a predetermined pattern and may output the structured light. The projector 3200 may include any one of the projectors 100, 101, and 102 of the above-described example embodiments or a combination thereof.

The first sensor 4300 and the second sensor 4400 may be placed at different positions relative to the projector 4200, and the processor 4700 may obtain depth information about an object OBJ from light coming from the object OBJ and sensed by at least one of the first and second sensors 4300 and 4400.

The depth recognition apparatus 4000 has a configuration in which sensors for depth recognition may also be used for normal photographing. As illustrated in FIG. 25, the first sensor 4300 includes a switchable filter 4310 that may be operated in an infrared cut-off mode or an infrared transmission mode, and an image sensor 4330 configured to sense light transmitted through the switchable filter 4310. However, this is a non-limiting configuration. Alternatively, the second sensor 4400 may include a switchable filter and an image sensor.

The processor 4700 controls the first sensor 4300 according to a normal photographic mode 4780 or a depth recognition mode 4790. In the normal photographic mode 4780, the switchable filter 4310 is controlled to block infrared rays, and thus an object image may be obtained from visible light reflected from the object OBJ and sensed by the image sensor 4330. In the depth recognition mode 4790, the switchable filter 4310 may be controlled to transmit infrared rays. Infrared image data for obtaining depth information is obtained from infrared rays reflected from the object OBJ and sensed by the image sensor 4330. In the depth recognition mode 4790, both the first sensor 4300 and the second sensor 4400 may be used, and the depth recognition mode 4790 may include the above-described various modes in which the processor 3700 of the depth recognition apparatus 3000 operates.

In a projector according to the example embodiments, a thin meta-lens is used instead of a lens module including a plurality of lenses of the related art, and thus, miniaturization of the projector is possible. Also, for manufacturing the projector, a process of aligning the lenses of the lens module is unnecessary, and thus, the manufacturing of the projector may be simplified.

The projector according to the example embodiments may project an image of a pattern mask, and also, may be used as an illuminator.

Also, the projector according to the example embodiments outputs an image formed of structured light to an object and captures an image reflected by the object, and thus, may be used as a light irradiation device of a depth sensor. When capturing light reflected by an object by outputting an image formed of structured light, further correct depth information may be obtained when compared to outputting general light to the object.

A lens structure of the projector according to the example embodiments may be used regardless of a light source.

While one or more example embodiments have been described with reference to the figures, it will be understood by those of ordinary skill in the art that various changes in form and details may be made therein without departing from the spirit and scope as defined by the following claims.

What is claimed is:

1. A depth recognition apparatus comprising:
 a projector;
 a first sensor, disposed in a first position with respect to the projector, and configured to receive light from an object;
 a second sensor, disposed in a second position with respect to the projector, different from the first position, and configured to receive light from the object; and
 a processor configured to analyze the light received by at least one of the first and second sensors and thereby calculate a depth position of the object,
 wherein the projector comprises:
   a light source configured to emit laser light;
   a substrate spaced apart from the light source;
   a pattern mask comprising a pattern disposed on a first surface of the substrate, the first surface disposed to receive the laser light emitted from the light source; and
   a first meta-lens comprising a plurality of first nanostructures disposed on a second surface of the substrate, the second surface opposite the first surface, each of the plurality of first nanostructures having a dimension that is less than a wavelength of the laser light emitted from the light source, and
 wherein the processor is further configured to:
   obtain first depth information about the object by analyzing structured light emitted from the projector onto the object and the light received by the first sensor, the first depth information including first information regarding the depth position of the object for obtaining a three dimensional shape of the object;

obtain second depth information about the object by analyzing the structured light emitted from the projector onto the object and the light received by the second sensor, the second depth information including second information regarding the depth position of the object for obtaining the three dimensional shape of the object; and calculate third depth information regarding the depth position of the object based on the first depth information and the second depth information, the third depth information having improved accuracy with respect to the first depth information and the second depth information.

2. The depth recognition apparatus of claim 1, wherein the processor is configured to:
obtain first image data from light received by the first sensor;
obtain second image data from light received by the second sensor; and
calculate the depth position of the object based on the first image data and the second image data.

3. The depth recognition apparatus of claim 1, further comprising an ambient light sensor configured to sense illuminance in an area surrounding the object,
wherein the processor is further configured to turn off the projector based on a signal sensed by the ambient light sensor being equal to or greater than a given value.

4. The depth recognition apparatus of claim 3, wherein when the projector is in an off-state, the processor is further configured to:
obtain first image data about the object from a signal output from the first sensor based on ambient light reflected from the object and received by the first sensor;
obtain second image data about the object from a signal output from the second sensor based on ambient light reflected from the object and received by the second sensor; and
calculate the depth position of the object based on the first image data and the second image data.

5. The depth recognition apparatus of claim 1, wherein the processor is further configured to:
when the projector is on, obtain primary-first image data and secondary-first image data based on light received by the first sensor and the second sensor, respectively; and
when the projector is off, obtain primary-second image data and secondary-second image data from light received by the first sensor and the second sensor, respectively.

6. The depth recognition apparatus of claim 5, wherein the processor is further configured to:
calculate the first depth information about the object based on the primary-first image data and the secondary-first image data;
calculate the second depth information about the object based on the primary-second image data and the secondary-second image data; and
calculate the depth position of the object based on the first depth information and the second depth information.

7. The depth recognition apparatus of claim 5, wherein the processor is further configured to:

calculate first image data based on a difference between the primary-first image data and the primary-second image data;
calculate second image data based on a difference between the secondary-first image data and the secondary-second image data; and
calculate the depth position of the object based on the first image data and the second image data.

8. The depth recognition apparatus of claim 1, wherein at least one of the first sensor and the second sensor comprises:
a switchable filter configured to be switched between an infrared-cut mode, in which infrared light is blocked, and an infrared transmission mode, in which infrared light is transmitted therethrough; and
an image sensor configured to sense light transmitted through the switchable filter.

9. The depth recognition apparatus of claim 8, wherein the processor is further configured to control the switchable filter to block infrared light in a normal photographic mode and to transmit infrared light in a depth recognition mode.

10. The depth recognition apparatus of claim 1, wherein the pattern mask comprises a first region which absorbs or reflects the laser light and a second region which transmits the laser light, and
the pattern of the pattern mask comprises an image pattern formed by the second region, and the image pattern is regularly or randomly arranged so as to form a structured light pattern.

11. The depth recognition apparatus of claim 10, wherein the plurality of first nanostructures focus structured light incident thereon onto a focusing plane spaced apart from the first meta-lens.

12. The depth recognition apparatus of claim 11, wherein the pattern mask contacts the substrate.

13. The depth recognition apparatus of claim 1, wherein the pattern mask comprises one of a metal, a black matrix, and a polymer.

14. The depth recognition apparatus of claim 1, wherein the light source comprises a surface light-emitting device configured to emit light onto the pattern mask.

15. The depth recognition apparatus of claim 1, wherein the plurality of first nanostructures comprise a material having a refractive index greater than a refractive index of a material surrounding the plurality of first nanostructures.

16. The depth recognition apparatus of claim 1, further comprising a housing configured fixed to the light source and the substrate, wherein the projector is an integrated module.

17. The depth recognition apparatus of claim 1, wherein the light source comprises an edge emitting device comprising an upper surface that is parallel to the substrate, and
the projector further comprises a path change member that reflects light emitted from the edge emitting device to the first surface of the substrate.

18. The depth recognition apparatus of claim 17, further comprising a second meta-lens comprising a plurality of second nanostructures on a surface of the pattern mask facing the light source.

19. The depth recognition apparatus of claim 18, wherein the second meta-lens is configured to collimate incident light beams to be parallel.

* * * * *